United States Patent [19]

Marrocco

[11] Patent Number: 4,664,194
[45] Date of Patent: * May 12, 1987

[54] GEL FOR RETARDING WATER FLOW

[75] Inventor: Matthew L. Marrocco, Santa Ana, Calif.

[73] Assignee: Cities Service Oil and Gas Corporation, Tulsa, Okla.

[ * ] Notice: The portion of the term of this patent subsequent to Feb. 12, 2002 has been disclaimed.

[21] Appl. No.: 693,680

[22] Filed: Jan. 22, 1985

Related U.S. Application Data

[63] Continuation-in-part of Ser. No. 514,557, Jul. 18, 1982, Pat. No. 4,498,540.

[51] Int. Cl.$^4$ .............................................. E21B 43/22
[52] U.S. Cl. ...................................... 166/295; 166/300
[58] Field of Search ................. 166/281, 294, 295, 300

[56] References Cited

U.S. PATENT DOCUMENTS

| Re. 30,767 | 10/1981 | Felber et al. . | |
|---|---|---|---|
| Re. 31,748 | 11/1984 | Block . | |
| 2,249,538 | 7/1941 | McDowell et al. . | |
| 2,311,059 | 2/1943 | Lowe . | |
| 2,832,414 | 4/1958 | Battle . | |
| 2,864,448 | 12/1958 | Bond et al. . | |
| 2,870,234 | 2/1959 | Moulton . | |
| 3,079,337 | 2/1963 | Turbak et al. . | |
| 3,265,536 | 8/1966 | Miller et al. . | |
| 3,265,657 | 8/1968 | Sinclair . | |
| 3,336,979 | 8/1968 | Ingraham et al. | 166/295 |
| 3,396,790 | 8/1968 | Eaton . | |
| 3,421,584 | 1/1969 | Eilers et al. . | |
| 3,452,817 | 7/1969 | Fallgatter . | |
| 3,554,287 | 1/1971 | Eilers et al. . | |
| 3,658,745 | 4/1972 | Merrill et al. . | |
| 3,741,307 | 6/1973 | Sandiford et al. . | |
| 3,749,172 | 7/1973 | Hessert et al. . | |
| 3,757,863 | 9/1973 | Clampitt et al. . | |
| 3,762,476 | 10/1973 | Gall . | |
| 3,785,437 | 1/1974 | Clampitt et al. . | |
| 3,794,115 | 2/1974 | Skagerberg . | |
| 3,795,276 | 3/1974 | Eilers et al. . | |
| 3,859,269 | 1/1975 | Maurer . | |
| 3,875,074 | 4/1975 | Vassiliades et al. . | |
| 3,912,529 | 10/1975 | Kotani et al. | 106/187 |
| 3,941,730 | 3/1976 | Solenberger . | |
| 3,981,363 | 9/1976 | Gall . | |
| 4,015,995 | 4/1977 | Hess | 166/195 |
| 4,018,286 | 4/1977 | Gall et al. . | |
| 4,039,029 | 8/1977 | Gall . | |
| 4,040,258 | 8/1977 | Argabright et al. | 166/195 |
| 4,098,337 | 7/1978 | Argabright et al. . | |
| 4,154,912 | 5/1979 | Phillips et al. . | |
| 4,262,067 | 5/1981 | Phillips et al. . | |
| 4,264,486 | 4/1981 | McLaughlin | 166/295 |
| 4,272,470 | 6/1981 | Hsu et al. . | |
| 4,328,864 | 5/1983 | Friedman . | |
| 4,349,443 | 9/1982 | Block . | |
| 4,353,804 | 10/1982 | Green et al. . | |
| 4,365,670 | 12/1982 | McLaughlin | 166/295 |
| 4,389,319 | 6/1983 | Block et al. . | |
| 4,411,800 | 10/1983 | Green et al. . | |
| 4,424,302 | 1/1984 | Block et al. . | |
| 4,428,845 | 1/1984 | Block . | |
| 4,473,480 | 9/1984 | Green et al. . | |
| 4,498,540 | 2/1985 | Marrocco | 166/295 |

FOREIGN PATENT DOCUMENTS

| 950355 | 7/1974 | Canada . |
|---|---|---|
| 55-157641 | 8/1980 | Japan . |
| 356408 | 10/1931 | United Kingdom . |
| 2073228 | 10/1981 | United Kingdom . |

OTHER PUBLICATIONS

Published abstract of Japanese Pat. No. 55-157641 (in English).
English translation of Japanese Pat. No. 55-157641 by the Ralph McElroy Co.
Journal of Colloid & Interface Science, vol. 90, No. 1, Nov. 1982, pp. 34-43.
Journal of the Electrochemical Society, vol. 130, No. 2, Feb. 1983, pp. 255-259.
U.S. Government Doc. N81-29531 (NASA Case No. LEW-13, 102-1).

Primary Examiner—Stephen J. Novosad
Assistant Examiner—William P. Neuder
Attorney, Agent, or Firm—F. Eugene Logan; William N. Patrick

[57] ABSTRACT

A polyvinyl alcohol-aldehyde gel having a high water content and low degree of crosslinking is provided which has improved stability. The gel can be used to retard the flow of water in subterranean formations encountered in hydrocarbon production. One embodiment of the invention provides a method of forming the gel in-situ in the pores of subterranean zones thereby retarding or blocking the flow of water therein.

90 Claims, 1 Drawing Figure

4,664,194

GEL FOR RETARDING WATER FLOW

This application is a continuation-in-part application of Ser. No. 514,55, filed July 18, 1982, now U.S. Pat. No. 4,498,540 which issued Feb. 12, 1985.

TECHNICAL FIELD

This invention relates to gels, methods of forming gels, and uses for gels. A polyvinyl alcohol-aldehyde hydrogel is provided which is useful for immobilizing large volumes of earth or water. The gel can be used for reducing the permeability of soils and subterranean formations to the flow of water or brines. The gels of this invention are particularly valuable in retarding the flow of water in hydrocarbon production from a wellbore, or from solar ponds,

BACKGROUND OF THE INVENTION

The recovery of hydrocarbons, both liquid and gaseous, from subterranean zones has frequently resulted in the simultaneous production of large quantities of water. In some cases, even though substantial flows of hydrocarbons have been shown, water production is so great and water disposal costs so high, that hydrocarbon production is not economical. Such water production has in some cases been disposed of in an abandoned or dry well by separating such water from the hydrocarbons and reinjecting the separated water into such wells. Where a disposal well is not available nor near the producing well, pipelining the water product over a long distance to a disposal site can become so costly that it renders the well noncommercial. Even if a disposal well is close by, the disposal cost can still be very expensive. Therefore it is desirable to find a way to reduce or shut off the flow of water while permitting hydrocarbon production to continue.

Thus, it is well known that the production of large amounts of water from hydrocarbon producing wells is a major expense item in the overall hydrocarbon recovery cost. It is not uncommon for an oil well to produce an effluent which is 60–99% by volume water and only 1–40% by volume oil. In such situations, the major part of the pumping energy is expended in lifting water from the well, a cost which the producer would like to avoid if possible. The effluent must then be subjected to a costly separation procedure to recovery water-free hydrocarbons. The foul water separated therefrom also presents a troublesome and expensive disposal problem. Consequently, it is desirable to decrease the volume of water produced from hydrocarbon wells. It is, of course, desirable to be able to achieve this objective and at the same time not materially affect the hydrocarbon recovery rate. However, where the volume of water is very high, e.g. 80 to 99% water, and only 1–20% oil, even substantial reduction in hydrocarbon production can be tolerated if water production can be substantially reduced.

One such method of reducing the flow of water has been described in U.S. Pat. No. 3,762,476 wherein a first aqueous polymer solution selected from the group consisting of a polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of Fe(II), Fe(III), Al(III), Ti(IV), Zn(II), Sn(IV), Ca(II), Mg(II), Cr(III), and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

Water produced from a well bore can come from the infiltration of naturally occuring subterranean water as described above, or the water can come from injected water put into the formation in those hydrocarbon recovery processes which utilize water flooding. U.S. Pat. No. 4,098,337 discloses a method for forming a hydroxymethylated polyacrylamide gel, in situ, to reduce the permeability of a thusly treated zone where the water flood method of oil recovery is employed. In this case the gel was formed in situ by the injection of an aqueous polyacrylamide solution and an aqueous formaldehyde solution.

In a water flood operation it can be desirable to treat the water injector wells with a polymer gel forming solution to control and/or redirect the water flow profile. Such treatment can prevent channeling of water at the injector well and/or control or redirect the water flow through regions of varying permeability.

Although polyacrylamide-based gels can be effective in retarding water production or flow in some subterranean formations polyacrylamide-based gels will not be stable or effective in all formations. In general, polyacrylamide-based gels will work satisfactorily in formations having a temperature below about 65° C. Above about 65° C., polyacrylamide-based gels become very sensitive to hardness of the brines, especially where hardness is above about 1000 ppm. The hardness of the water becomes a more detrimental factor the higher the temperature, thus for very hot regions lower hardness levels can render many gels ineffective. Formations which have a higher temperature, hardness, or total dissolved solids content above the aforementioned ranges usually are not capable of being successfully treated with polyacrylamide-based polymers to retard the flow of water.

In many hydrocarbon producing wells temperatures of 80° C. or higher are often encountered. Formation waters frequently have hardnesses which exceed 1000 ppm. It is therefore desirable to develop a gel which can be used to retard or block the flow of water in subterranean formations having a temperature of 65° C. or higher, and a water hardness of 1000 ppm or higher.

This invention addresses this problem and provides a means of treating such wells with a polyvinyl alcohol based gel which can overcome many of the short comings of prior art gels.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel prevents the intrusion of formation water into the annular space thereby reducing corrosion of the metal casing. Apparently, no crosslinking agent is employed and for that reason is not believed that this particular gel would be useful. Furthermore, in U.S. Pat. No. 2,832,414 the gel is used to fill a relatively large cavity compared to the cavity volume of a typical pore in a subterranean formation associated with hydrocarbon production from a well bore.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol substances that were crosslinked with glutaric dialdehyde which were then converted to acetate gels by polymer homologous acetylation.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as a dialdehyde or a substituted monoaldehyde. By substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehyde, glutaraldehyde, adipaldehyde, terephthaldehyde. Non-limiting examples of dialdehyde derivatives are glyoxal bisulfite addition compound

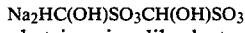

Na$_2$HC(OH)SO$_3$CH(OH)SO$_3$ glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate aldehydes in water, either alone or in response to an additional agent such as an acid or a condition such as heat are also meant to be included in the term "aldehyde derivative" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" as used herein is meant a substance which is a proton donor or a substance which in its environment will form or become a proton donor. All acids are operable as an acidic catalyst in this invention, for example, Bronsted acids such as mineral and carboxylic acids, or Lewis acids. Non-limiting examples of a Lewis acid are zinc chloride, ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acids determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

In one embodiment of this invention the acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolyzes more slowly that methyl formate at all temperatures including the higher temperatures. Therefore in some embodiments of this invention where subterranean formations having higher temperatures are encountered, diacetin or acetin because of their slower rate of hydrolysis are used to provide a longer time for crosslinking reactions to occur and hence provide a longer time for the gel forming fluids to penetrate into the pores of such subterranean zones before gelation occurs. Non-limiting examples of delayed action catalyst and their acidic catalyst product are:

| Delayed Action Catalyst | Acidic Catalyst Product |
|---|---|
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein is meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules. Thus "gel" as used herein does not include films.

By the term "PVA-aldehyde gel" as used herein is meant a chemically crosslinked three-dimensional elastic network of long-chain molecules (frequently referred to herein as the "first substance") selected from the group consisting of polyvinyl alcohols polyvinyl alcohol copolymers, and mixtures thereof, crosslinked with an aldehyde, and containing a certain amount of immobilized and chemically bound water mole- cules.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alco- hols.

Description of the Gels

There is provided by this invention a gel formed by reacting, in the presence of an acidic catalyst, a first substance selected from the group consisting of polyvinyl alcohol, a polyvinyl alcohol copolymer, and mixtures thereof, with a second substance comprising an aldehyde, and water. In one embodiment water provides at least about 95% of the weight of the gel. In another embodiment such water provides at least about 96% of the weight of the gel. In still another embodiment such water provides at least about 97% of the weight of the gel. In a preferred embodiment such water provides at least about 98% or about 99% of the gel. If desired the water can be supplied as a brine since pure water is not required.

There is also provided by this invention a gel formed by reacting, in the presence of an acidic catalyst, a first substance having crosslinkable sites selected from the group consisting of polyvinyl alcohols, polyvinyl alcohol copolymers, and mixtures thereof; a second substance comprising an aldehyde. In one embodiment the amount of aldehyde is adjusted so that stoichiometrically no more than about 8% of the crosslinkable sites of the first substance can be crosslinked with the aldehyde; and water. In one embodiment the amount of said aldehyde is adjusted so that stoichiometrically no more than about 4% of the crosslinkable sites of the first substance can be crosslinked with the aldehyde. In a preferred embodiment the amount of the aldehyde is adjusted so that stoichiometrically no more than about 2% of the crosslinkable sites of the first substance can be crosslinked with the aldehyde. In another preferred embodiment the amount of aldehyde is adjusted so that stoichiometrically no more than about 1% of the crosslinkable sites of the first substance can be crosslinked with the aldehyde.

In further embodiments of the above gels, the gel is formulated so that it is stable for at least about six months when maintained at a temperature of about 65° C.

In further embodiments of the above described gels the relative amounts of, and the selection of, the first substance, the aldehyde, the water or water-containing liquid, and the acidic catalyst are adjusted so that when the gel is gelled in the pores of a sandstone core which is continuously maintained at 80° C. there will be produced a permeability in the core to an aqueous liquid selected from the group consisting of water and brine, about 90 days after gelation of the gel in the core, which is no greater than about 15% of the permeability of the core to the aqueous liquid prior to the gelling of the gel in the core.

In other further embodiments of the above gels, the relative amounts of, and selection of, the first substance, the aldehyde, the water or water-containing liquid, and the acidic catalyst are adjusted so that the gel when gelled in the pores of a sandstone core which is continuously maintained at 125° C. will produce a permeability in the core to an aqueous liquid selected from the group consisting of water and brine, about 40 days after gelation of the gel in the core, which is no greater than about 40% of the permeability of the core to the aqueous liquid prior to the gelling of the gel in the core.

In preferred embodiments of the gels, the aldehyde is a dialdehyde. In a further embodiment the dialdehyde is selected from the group consisting of glyoxal, malonaldehyde, succinaldehyde, glutaraldehyde, adipaldehyde and mixtures thereof.

In other embodiments of the gels the amount the aldehyde is from about 0.005 to about 2.5% of the weight of the gel.

In still further embodiments of the above described gels, the water used to form the gel has a hardness of at least about 1000 ppm. in further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm.

In other embodiments the water used to form the gels has a pH between about 2 and about 5. In preferred embodiments, the water used to form the gel has a pH between about 2.5 and about 4.5. In some embodiments the aldehyde of the above gels is at least about 50% wt malonaldehyde and in other embodiments the aldehyde is at least about 50% wt glutaraldehyde.

In other embodiments of the above described gels the first substance is selected from the group consisting of polyvinyl alcohols, polyvinyl alcohol copolymers, and mixtures thereof, which has an average molecular weight of at least about 100,000.

In other embodiments the amount of the first substance is from about 0.5 to about 5% of the weight of the gel.

In other embodiments of the gels of this invention, the gel is treated with a basic substance, and preferably such treatment neutralizes the gel and/or acidic catalyst used to form the gel, or the immediate environment in which the gel is utilized.

In some embodiments of this invention the polyvinyl alcohols and/or polyvinyl alcohol copolymers of the above described gels are crosslinked with aldehydes to form hydrogels containing from about 95 to 98 or 99% water. The aldehydes crosslink the polyvinyl alcohols or polyvinyl alcohol copolymers through formation of acetals. It has been found that gels formed in this way are insensitive to the hardness of the water in which they are formed or exposed, or formed from. These gels are also more stable at high temperatures than polyacrylamide based gels or gels made from biopolymers or polyvinyl alcohols gelled by other crosslinking agents such as borate. It is to be understood that the term "water" is meant to include brines unless otherwise specified.

Because of the insensitivity of these gels to water hardness or total dissolved solids content, these gels can be prepared using formation water, brackish water, sea water or usually any other available source of water conveniently at hand including formation brine. Because the largest ingredient used to formulate the above described gels is principly water, substantial economic advantage is provided by this invention which permits gels to be formed with the cheapest source of available water. However, the advantages of this invention are not limited merely to economic advantages because these gels also provide substantial technical advantages over other gels. For example, in many of their uses these gels are subjected to the infusion of severly contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Methods of Forming Gels In Situ

This invention also provides for a method of forming, in situ, a gel in a subterranean zone comprising introducing an aqueous solution which comprises a first substance selected from the group consisting of polyvinyl alcohols, polyvinyl alcohol copolymers, and mixtures thereof, into voids of a subterranean formation or zone; introducing a second substance comprising an aldehyde or derivative thereof into the voids; and forming a gel in the voids by the reaction of the first substance with the second substance or aldehyde substance in the presence of an acidic catalyst or, stated another way, under acidic conditions.

There is also provided by this invention a method of forming, in situ a gel in a subterranean zone comprising introducing an aqueous solution which comprises a first substance selected from the group consisting of polyvinyl alcohols, polyvinyl alcohol copolymers, and mixtures thereof into voids of a subterranean zone; introducing a second substance comprising an aldehydes into the voids; introducing an acidic catalyst into the voids; and forming a gel in said voids by the reaction of the first substance with the second substance in the presence of the acidic catalyst.

In further embodiments of the above described methods, the aqueous solution has a pH between about 2 and about 5, and in preferred embodiments the pH is between about 2.5 and about 4.5. Acidic pH's outside these ranges can be used; however, the rate is usually too fast or too slow for practical application. In further embodiments the acidic catalyst is a Bronsted acid and in other embodiments the acidic catalyst is a Lewis acid. In other embodiments the acidic catalyst is a delayed action catalyst. In still further embodiments of the above described methods the aqueous solution and the second substance are introduced into the voids in one time period and the acidic catalyst is introduced into the voids in another time period which is different from the first mentioned time period. In other embodiments of such methods the aqueous solution is introduced into the voids in one time period, and the second substance and the acidic catalyst are introduced into the voids in another time period which is different than the first mentioned time period. In still alternate embodiments of such methods the aqueous solution, the second substance, and the acidic catalyst are mixed together before introducing them into the voids. In still other embodiments of such methods the acidic catalyst is a delayed action catalyst.

In other embodiments the subterranean zone in which the gel is formed has a temperature of at least about 80° C., and in other embodiments at least about 125° C.

The above described methods of forming a gel in situ in subterranean formations can be practiced using all of the gels provided by this invention.

Processes for Retarding Water Flow

This invention also provides for a process for retarding the flow of water in a subterranean zone comprising treating a subterranean zone with an effective amount of a gel operable for retarding the flow of water in the zone, the gel in the presence of an acidic catalyst being formable from an aqueous solution comprising a first substance selected from the group consisting of polyvinyl alcohols, polyvinyl alcohol copolymers, and mixtures thereof, and a second substance comprising an aldehyde.

There is also provided by this invention a process for retarding the flow of water in a subterranean zone comprising treating the zone with an effective amount of a gel under conditions which are operable for retarding the flow of water in the zone, the gel being formed in the presence of an acidic catalyst by reacting an aqueous solution comprising a first substance selected from the group consisting of polyvinyl alcohols, polyvinyl alcohol copolymers, and mixtures thereof, and a second substance comprising an aldehyde, and allowing the aqueous solution and the aldehyde to react in the zone in the presence of the acidic catalyst to form a gel in the zone which is effective for retarding the flow of water in the zone.

In still another embodiment there is provided a process for improving the production of hydrocarbons and retarding the production of water from a subterranean hydrocarbon-producing zone comprising treating a subterranean water-conveying zone which is in water communication with a subterranean hydrocarbon-producing zone with an effective amount of a gel operable for retarding the flow of water in the subterranean water-conveyong zone, the gel being formed, in the presence of an acidic catalyst, by reacting an aqueous solution comprising a first substance selected from the group consisting of polyvinyl alcohols, polyvinyl alcohol copolymers, and mixtures thereof, and a second substance comprising an aldehyde. This particular embodiment further comprises allowing the aqueous solution and the aldehyde to react in the subterranean water-conveying zone to form a gel in such zone which is operable for retarding the flow of water in such zone and retarding the production of water from the hydrocarbon-producing zone, and producing hydrocarbons and retarding the production of water from the subterranean hydrocarbon-producing zone. The principles of this invention can be used where the subterranean water-conveying zone is under the subterranean hydrocarbon-producing zone; or where the subterranean water-conveying zone surrounds the subterranean hydrocarbon-producing zone; or where at least part of the subterranean water-conveying zone coincides with at lease part of the subterranean hydrocarbon-producing zone.

Still further the embodiments of the above described processes, can be used where the subterranean zone has a temperature of at least about 65° C.; or where such temperature is at least about 80° C., or even more advantageously relative to other commonly employed gels where such temperature is at least about 125° C.

In some embodiments the aqueous solution of the above described processes is formed from water having a hardness of at least about 1000 ppm. In some embodiments the aqueous solution of the above described processes is formed from water having a total dissolved solids content of at least about 30,000 ppm. In other embodiments, the aqueous solution used in the above described processes has a pH between 2 and about 5. In other embodiments of the above described processes the first substance has an average molecular weight of at least about 100,000.

In one embodiment of this invention directed to a water flood operation, it frequently is desirable to treat the water injector wells with a polymer gel forming solution to control the water flow profile. In this embodiment such treatment prevents channeling of water at the injector well and/or controls and/or redirects water flow through regions of varying permeability. Since in this embodiment the polymer is injected as a relatively low viscosity aqueous phase it penetrates preferentially the region of highest permeability to water. Accordingly, after polymerization of the gel in high permeability regions, such regions are converted to low permeability to further retard water flow thereby causing, upon further water injection, a water sweep of previously inaccessible areas in the formation which usually have relatively low permeability. By extending the water flow to such previously inaccessible regions, more hydrocarbons can be recovered than would be recovered in the absence of such polymer treatment.

The above described processes for retarding the flow of water in subterranean zones can be practiced with all of the gels provided by this invention.

Where the gels of this invention are used to retard or block the flow of subterranean water associated with the production of hydrocarbons from wells it is preferable to form the gel from as high a molecular weight polyvinyl alcohol or polyvinyl alcohol copolymer as practical, to crosslink with a dialdehyde having as long a chain of carbon atoms as practical, to form as few crosslinks as necessary to hold the gel together, and to maximize the amount of water used to form the gel. For example preferably the gel meets one or more of the following specifications:

The average molecular weight of the polyvinyl alcohol or a copolymer thereof is at least about 100,000.

The polyvinyl alcohol or copolymer thereof provides about 0.5 to about 5% of the weight of the gel.

The aldehyde is a dialdehyde selected from the group consisting of glyoxal, malonaldehyde, succinaldehyde, glutaraldehyde, adipaldehyde, and mixtures thereof.

The aldehyde provides about 0.005 to about 1.5% of the weight of the gel.

The amount of the aldehyde is such that stoichiometrically no more than about 2% or about 1% of the crosslinkable sites of the polyvinyl alcohol or copolymer thereof can be crosslinked with the aldehyde.

The water of the gel-forming composition provides about 98% or about 99% of the weight of the gel.

Gels meeting one or more of the above described specifications are stretchable, elastic and relatively stable in high temperature formation having high water hardness levels.

The gels of this invention have improved resistance to heat and are stable in hard water. These characteristics make these gels particularly useful for many oil field applications such as water mobility control. These gels may be advantageously used in other harsh environments such as solar pond construction where they can be used to consolidate loose soil and to retard or stop the leakage of brine through the pond floor, or to prevent convective flow of the lower, hotter water into the upper, cooler water layer(s). For oil field application, no other gels are known which exhibit the stability and durability of the gels of this invention.

Accordingly, one objective of this invention is to provide a means of controlling water movement in oil wells and subterranean formations especially in formations having temperatures 80° C. or higher, or where the waters involved are saline or hard.

Another object of this invention is to provide a means to thicken or gel water with an inexpensive polymer for other oil field developmental uses such as fracture fluids and fluids for secondary and tertiary oil recovery. It is another object of this invention to provide a gel which can be formulated using hard water and water containing a high level of dissolved solids such as sea water and formation water encountered in deep off-shore hydrocarbon fields.

Another object of this invention is to provide a gel which is stable at high temperatures and in particular more stable than other gels at such high temperatures.

DESCRIPTION OF THE PREFERRED EMBODIMENT

Figure 1:
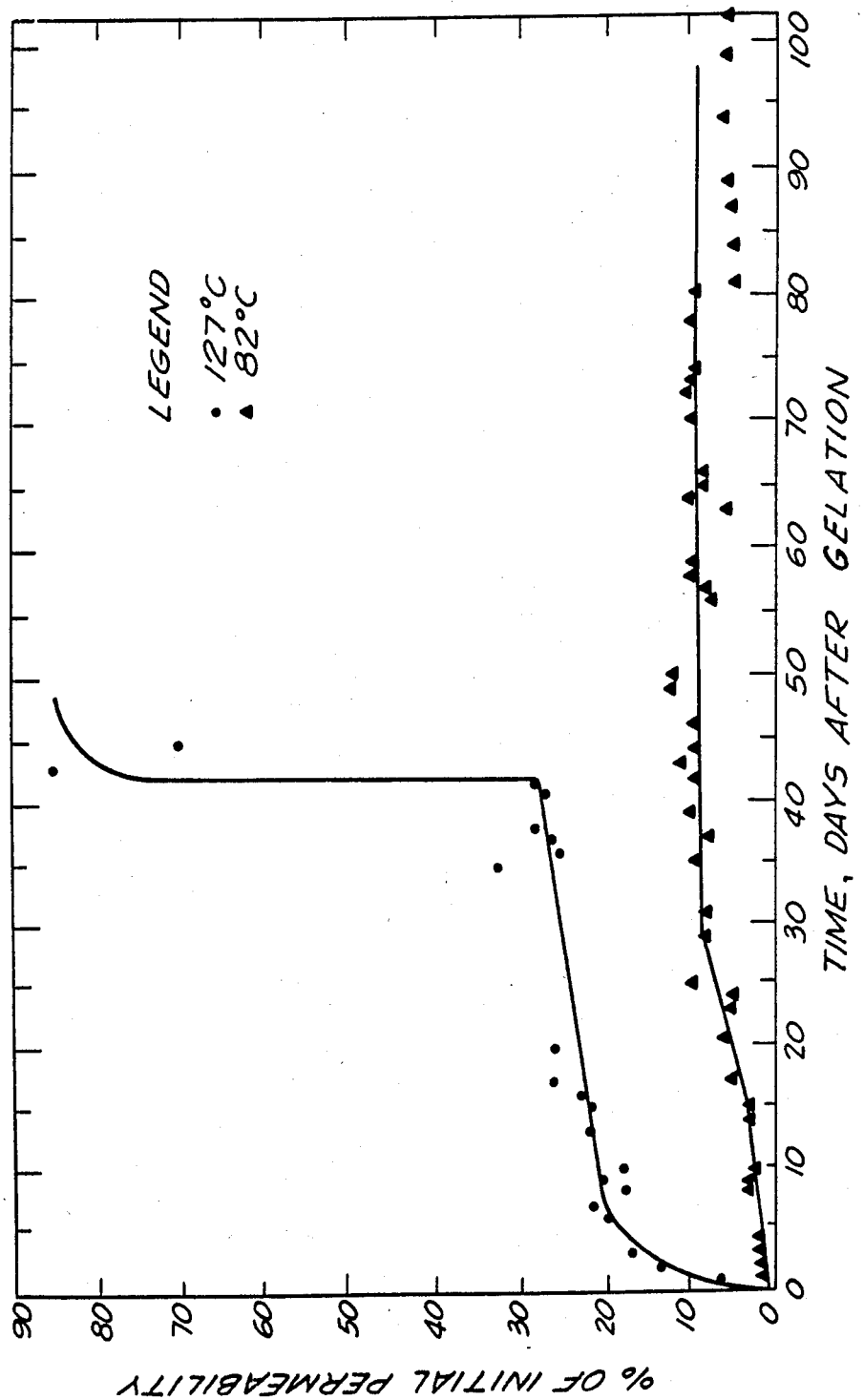
FIG. 1 is a plot of the percent of original permeability of sandstone cores after their treatment according to the precepts of this invention.

An oil well having an undesirable amount of water production is treated by injecting a polyvinyl alcohol solution containing 1 to 50,000 ppm of polyvinyl alcohol having an average molecular weight of 100,000 or higher. This is followed by injection of a crosslinking agent such as glyoxal with an acidic catalyst. The polymer will undergo crosslinking and gel in situ in a period of time ranging between several hours to several days depending upon, in part, the temperature and amount of acidic catalysts. The following examples demonstrate how some of the gels of this invention can be made and how such gels are effective in reducing the permeability of sandstone materials to the flow of brines.

EXAMPLES

The following examples demonstrate the procedures by which polyvinyl alcohol (PVA) solutions can be gelled using malonaldehyde bisdimethylacetal as crosslinking agent and sulfuric or acetic acid as catalyst. In this example and all later examples calling for 2.5 wt % PVA in water or brine, a stock solution was prepared first by slowly adding the appropriate weighed amount of dry PVA powder to the water at room temperature with stirring and then, with continued stirring, raising the temperature to 100° C. in a hot water bath. A clear homogeneous solution resulted after 30 minutes at 100° C. at which time the solution was allowed to cool to room temperature. The polyvinyl alcohol was (unless otherwise stated) 98% hydrolyzed, 126,000 molecular weight polyvinyl alcohol (Aldrich Chemical Co.) or Elvanol HV 99% hydrolyzed polyvinyl alcohol (DuPont).

As used herein, Brine A refers to a synthetic brine prepared by adding the following amounts of salts to deionized water and adjusting the volume to 1 liter:

| | |
|---|---|
| NaCl | 75.5 gr, |
| NaHCO$_3$ | 1.2 gr, |
| MgSO$_4$.7H$_2$O | 1.1 gr, |
| MgCl$_2$.6H$_2$O | 3.56 gr, and |
| CaCl$_2$.2H$_2$O | 20.76 gr. |

As used herein, Brine B refers to a synthetic brine prepared by adding the following amounts of salts to deionized water and adjusting the volume to 1 liter:

| | |
|---|---|
| NaCl | 61.02 gr, |
| KCl | 1.39 gr, |
| CaCl$_2$.2H$_2$O | 9.20 gr, |
| MgCl$_2$.6H$_2$O | 5.77 gr, and |
| BaCl$_2$.2H$_2$O | 0.02 gr. |

As used herein, Brine C refers to a synthetic brine prepared by adding the following amounts of salts to deionized water and adjusting the volume to 1 liter:

| | |
|---|---|
| NaCl | 75.5 gr, |
| MgSO$_4$.7H$_2$O | 1.1 gr, |
| MgCl$_2$.6H$_2$O | 3.56 gr, and |
| CaCl$_2$.2H$_2$O | 20.76 gr. |

EXAMPLE NO. 1

0.01 ml malonaldehyde bisdimethylacetal was added to 5 ml of a 2.5 wt % solution of PVA in deionized water. This solution was acidified by adding 0.05 ml of concentrated H$_2$SO$_4$. After 3.25 hrs at room temperature this solution had gelled to a cloudy white solid. After four hrs a small amount of water began to separate from the gel.

EXAMPLE NO. 2

0.01 ml malonaldehyde bisdimethylacetal was added to 5 ml 2.5 wt % PVA in deionized water. This solution was acidified by adding 0.05 ml acetic acid. The sample was then maintained, in a capped glass vial, at 95° C. A pale white gel formed after 1.75 hrs at room temperature.

EXAMPLE NO. 3

The following example illustrates the effect of neutralizing the acidic catalyst after the gel has formed, on gel stability.

Two sample vials were each charged with 5 ml 2.5 wt % PVA in deionized water. To each was added 0.005 ml of malonaldehyde bisdimethylacetal and 0.05 ml of 1.8 M sulfuric acid. The vials were then capped and placed in a 95° C. oven. After 1 hour one of the vials was removed from the oven and treated with 48 mg NaHCO$_3$ in 2 ml H$_2$O for 16 hrs, after which the solution was decanted off and the remaining clear gel was rinsed with three 5 ml portions of deionized water. The gel was returned to the oven. After one week at 95° C. the gel which had been treated with NaHCO$_3$ remained clear. The sample which had not been treated with NaHCO$_3$ had clouded within 24 hrs and disintegrated within one week.

EXAMPLE NOS. 4 TO 8

Gelation of Polyvinyl Alcohol with Glutaraldehyde

A stock solution of 2.5 wt % polyvinyl alcohol was prepared in Brine A. To 20 ml of this solution was added 0.5 ml acetic acid, 0.02 ml of a 25 wt % solution of glutaraldehyde in water. The pH was then adjusted to the desired value with sodium acetate solution (0.344 gr NaC$_2$H$_3$O$_2$.3H$_2$O per ml Brine A). The resulting solution was mixed thoroughly and placed in a stoppered container in a constant temperature bath at 80° C. The gel point, characterized by an abrupt increase in viscosity, was determined by monitoring the viscosity with a Brookfield Viscosimeter or noting visually the resistance to stirring with a magnetic stir bar. Each test for Example Nos. 4 to 8 was conducted entirely at 80° C. Test parameters and gel times are shown in Table I.

TABLE I

| | CONCENTRATION (wt. %) | | | | | |
|---|---|---|---|---|---|---|
| Example No. | PVA | Glutar- aldehyde | Acetic Acid | NaC$_2$H$_3$O$_2$ .3H$_2$O | pH | Gel Time (min) |
| 4 | 2.4 | 0.025 | 2.3 | 2. | 3.54 | 70.5 |
| 5 | 2.5 | 0.025 | 2.3 | 0.6 | 3.33 | 40 |
| 6 | 2.5 | 0.025 | 2.4 | 0.25 | 3.00 | 24 |
| 7 | 2.5 | 0.025 | 2.4 | 0.17 | 2.90 | 18 |
| 8 | 2.5 | 0.025 | 2.4 | 0.10 | 2.71 | 13 |

EXAMPLES NOS. 9 TO 11

Example Nos. 9 to 11 demonstrate the effect of temperature on gel time.

A stock solution of 2.4 wt % PVA was prepared in synthetic Brine A. To 20 ml of this solution was added 0.5 ml of acetic acid, 0.04 ml of malonaldehyde bisdimethylacetal, and enough of a sodium acetate solution (0.344 gr NaC$_2$H$_3$O$_2$.3H$_2$O per 1 ml Brine A) to bring the pH of the solution to 2.9. The resulting solution was thoroughly mixed and placed in a stoppered vial in a constant temperature bath at the temperature shown in Table II. The gel times were determined as in Example Nos. 4 to 8.

TABLE II

| Example No. | T (°C.) | Gel Time (min) |
|---|---|---|
| 9 | 65 | 162 |
| 10 | 95 | 31 |

TABLE II-continued

| Example No. | T (°C.) | Gel Time (min) |
|---|---|---|
| 11 | 127 | 13.5 |

Example Nos. 12 to 18 illustrate the use of delayed acidic action catalysts.

EXAMPLE NO. 12

A mixture of 20 ml of 2.5 wt % PVA in Brine A, 0.005 ml of glutaraldehyde and 79 mg of ZnCl$_2$ in 1 ml of Brine A was placed in a stoppered vial and kept at 180° F. After 21 hrs the solution had not gelled. An additional 30 mg ZnCl$_2$ was added. After 141 hrs at 180° F. a semi-rigid gel had formed. Similar experiments using 0.5%, 1% and 2% ZnCl$_2$ and 2.5% PVA in sea-water failed to yield gels after 350 hrs at 180° F.

EXAMPLE Nos. 13 to 16

In Example Nos. 13 to 16, the samples were prepared with a total volume of 20 ml using the following wt % concentrations.

| Example No. | CONCENTRATION - (wt. %) | | | | Gel Time (hrs) |
|---|---|---|---|---|---|
| | PVA | Methyl Formate | Glutar-aldehyde | Water Source | |
| 13 | 2.5 | 0.144 | 0.1 | Tap | 29 |
| 14 | 2.5 | 0.048 | 0.1 | Tap | 144 |
| 15 | 2.5 | 0.144 | 0.1 | Brine B | 21 |
| 16 | 2.5 | 0.048 | 0.1 | Brine B | 21 |

After 5 hrs at 180° F., the solutions had not thickened perceptibly. After 21 hrs the samples prepared with Brine B had gelled. The samples in tap water took slightly longer to form and were not as rigid as those in Brine B.

EXAMPLE NOS. 17 AND 18

To 10 ml of a solution of 2.5 wt % PVA in Brine B was added 0.007 ml (0.075 wt % of the total mixture) of glutaraldehyde and 0.015 ml (0.18 wt % of the total mixture) of glycerol monoacetate. A second solution was made substituting 0.015 ml of glycerol diacetate for the glycerol monoacetate. The solutions were held at 180° F. After 20 hr there was no observable change. After 25 hrs, both had formed very soft, flowing gels. After 92 hrs both had formed rigid elastic gels, and some water had separated.

EXAMPLE Nos. 19 and 20

These Examples demonstrate the use of polyvinyl alcohol gels to reduce the permeability of porous media to brine.

Core Sample Preparation Procedure

A sandstone core about 3 inches long by 1.5 inches in diameter was first saturated with brine and then mounted in a core holder similar to commercially available core holders which are known in the arts such as those sold by Core Laboratories, Inc., in Dallas, Tex. Such core holders have a tightly fitting expandable sleeve for extending entirely over the cylindrical length of the core and beyond the ends of the core. The sleeve is used to attach and mount the core in the core holder apparatus. The core holder was placed in an oven, equilibrated to the desired test temperature, and connected to a system operable for infusing a gel forming fluid into the pores of the core. The pressure drop across the length of the core was measured during its treatment with the gel forming fluid.

To simulate a formation in which oil has been displaced by water, as for example in a subterranean oil producing formation, after being equilibrated to test temperature, the core was first infused with kerosene and then infused with brine to simulate subterranean environments encountered. The brine and the test temperature should be selected so as to best simulate the particular conditions of the formation of interest. Conditioning of the core in this manner is referred to herein as "residual oil formation simulation".

When residual oil formation simulation had been established in the core, its permeability to brine was determined using Darcy's law by measuring the pressure drop across the length of the core for various brine flow rates. The calculations were made as follows:

$$K = \frac{l \cdot u \cdot q}{A \cdot P} \times 1000, \text{ where}$$

K is the permeability of the core in millidarcies,
l is the length of the core in cm,
u is the viscosity of brine in cp,
q is the flow rate of brine in cc/sec,
p is the pressure drop across the length of the core in atm, and
A = cross section of the core in cm$^2$.

After forming a test gel in the pores of the core, the permeability of the core is substantially reduced. This is evidenced by an increased pressure drop across the core relative to that existing before gelation. Using Darcy's equation, the new permeability can be expressed as a percent of the original permeability as follows, where $$100 \left( \frac{K_t}{K_o} \right) \text{ is the \% of original permeability,}$$

$K_t$ is the permeability at time t after gel formation, and
$K_o$ is the original permeability.

The duration of the gels effectiveness, which is referred herein as its stability, can be monitored by determining $K_t$ as a function of time. During testing the core is continually maintained at the temperature of interest.

To prevent the gel from setting up in the apparatus, the test procedure adopted first pumped into the core a non-gelling composition, followed by the test composition, which was followed by a small quantity of additional non-gelling compositions. Since such fluid flowed through the core in plug like flow, the quantities of fluids were controlled so that the gelling fluid remained only in the core, with non-gelling composition in the apparatus and slightly in each end of the core.

The Example Nos. 19 and 20, which follow, show the actual reduction in permeability which was experienced after forming a PVA-aldehyde gel in the pores of sandstone cores.

EXAMPLE NO. 19, GEL FORMATION AT 127° C. (260° F.)

After equilibration to 127° C., a Berea sandstone core, 3 inches long and 1.5 inches in diameter was conditioned for residual oil formation simulation, using Brine C, as described above. An aliquot of gel forming fluid equal to 0.70 pore volume (14.9 cc) was infused into the core which was then followed by an infusion of 0.20 pore volume (4.3 cc) of Brine C. In this manner the gel forming fluid was infused into the center part of the core, while each end of the core (about 0.10 pore volume on one end and about 0.20 pore volume on the other end of the core) remained essentially free of the gel forming fluid. Flow was stopped for 4 hours and the gel was then allowed to form in the pores. Thereafter, intermittent infusion with Brine C was conducted over the next 50 days to determine the permeability of the thusly "gelled" core to Brine C. The results are given in Table III and shown in FIG. 1 wherein the permeability of the core is expressed as the percent of the original core permeability as a function of time.

In this Example, the gel forming fluid was prepared by combining 100 cc of 2.5 wt % with polyvinyl alcohol in Brine C, 1 cc of glacial acetic acid, 0.365 gr of sodium acetate trihydate, and 0.20 ml of malonaldehyde-bisdimethylacetal. The pH of the initial gel forming fluid was 3.4.

EXAMPLE NO. 20, GEL FORMATION AT 82°C. (180° F.)

Another Berea sandstone core was equilibrated to 82° C. and conditioned for residual oil formation simulation using Brine B, as described above. An aliquot of gel forming fluid equal to 0.75 pore volume (13.7 ml) was infused into the pores of the core. The gel forming fluid in the lines leading to the core was then forced into the core by displacement with 7.0 ml of 2.5% polyvinyl alcohol. The flow was stopped for 3 hours to permit the gel to form. Thereafter, intermittent brine infusion over the next three months was conducted to determine the permeability of the thusly "gelled" core to Brine B.

The gel forming fluid for this Example was prepared by combining 100 ml of 2.5 wt % polyvinyl alcohol in Brine B and 0.125 ml of 25% aqueous glutaraldehyde followed by adjustment of the pH to 2.7 with glacial acetic acid (0.8 ml). The results of this experiment are also given in Table IV and shown in FIG. 1.

Unless otherwise specified herein all percents are weight percents.

The gels, the methods of forming the gels, and the processes for retarding the flow of water have some degree of flexibility. For example, if the environment in which the gels are to be used has a relatively high temperature, gel time can be slowed by using a smaller amount of acidic catalyst. Similarly, if the environmental temperature is relatively low, gelation can be speeded by the use of larger amounts of acidic catalyst. If it is desirable to use the formation water in a subterranean zone as part of the final gel, a delayed action catalyst can be used to allow for the diffusion of such formation water into the injected gel-forming fluids so that such formation water will become part of the gel. For water blocking in subterranean zones it is preferred to use a relatively small amount of aldehyde so that the degree of crosslinking is relatively small because gels with low degrees of crosslinking have been found to be more stable than gels with a relatively high degree of crosslinking. Other variations of formulations, methods and processes will be apparent from this invention to those skilled in the art.

The foregoing disclosure and description of the present invention is illustrative and explanatory thereof and various changes in gel formation procedures and gel composition as well as the uses and applications of such gels to form them in situ in subterranean zones and to retard or block water in subterranean zones may be made within the scope of the appending claims without departing from the spirit of the invention. For example, many gel formulations can be produced and many methods of forming such gels in situ in subterranean deposits will be apparent to one skilled in the art from this invention. For example, any number of sequential injection steps of the gel forming fluids can be made. Furthermore, the necessary concentrations, amounts and sequence of injection of the gel forming fluids can be tailored to suit the particular well or subterranean formation being treated.

TABLE III (Example No. 19)
Gel Formation at 127° C. (260° F.)
Gel Forming Fluid Composition (wt. %)

| | |
|---|---|
| 98.51 | 2.5 wt % polyvinyl alcohol in Brine C |
| 0.97 | Glacial acetic acid |
| 0.34 | Sodium acetate trihydrate |
| 0.18 | Malonaldehyde-bisdimethylacetal |

% of Initial Permeability
vs
Time Lapsed After Gelation

| Time (days after Gelation) | Permeability (% of initial permeability before treatment with gel forming fluids) |
|---|---|
| 1 | 6.1 |
| 2 | 13.1 |
| 3 | 16.9 |
| 6 | 19.8 |
| 7 | 21.3 |
| 8 | 17.2 |
| 9 | 20.8 |
| 10 | 18.0 |
| 13 | 21.9 |
| 15 | 21.9 |
| 16 | 22.5 |
| 17 | 25.3 |
| 20 | 25.3 |
| 35 | 32 |
| 36 | 25 |
| 37 | 26 |
| 38 | 28 |
| 41 | 27 |
| 42 | 29 |
| 43 | 85 |
| 45 | 70 |

TABLE IV (Example No. 20)
Gel Formation at 82° C. (260° F.)
Gel Forming Fluid Composition (wt %)

| | |
|---|---|
| 99.13 | 2.5 wt % polyvinyl alcohol in Brine C |
| 0.12 | 25% aqueous glutaraldehyde |
| 0.75 | Glacial acetic acid |

% of Initial Permeability
vs
Time Lapsed After Gelation

| Time (days after gelation) | Permeability (% of Initial permeability before treatment with gel forming fluids) |
|---|---|
| 1 | 1.3 |
| 2 | 1.3 |
| 3 | 1.8 |
| 4 | 1.7 |
| 8 | 2.8 |
| 9 | 2.8 |
| 10 | 2.0 |
| 14 | 2.5 |
| 15 | 2.7 |
| 17 | 4.4 |
| 22 | 5.3 |
| 23 | 4.9 |

TABLE IV-continued (Example No. 20)
Gel Formation at 82° C. (260° F.)

Gel Forming Fluid Composition (wt %)

| | |
|---|---|
| 99.13 | 2.5 wt % polyvinyl alcohol in Brine C |
| 0.12 | 25% aqueous glutaraldehyde |
| 0.75 | Glacial acetic acid |

% of Initial Permeability
vs
Time Lapsed After Gelation

| Time (days after gelation) | Permeability (% of Initial permeability before treatment with gel forming fluids) |
|---|---|
| 24 | 4.7 |
| 25 | 9.5 |
| 29 | 7.8 |
| 31 | 7.5 |
| 35 | 8.3 |
| 37 | 7.3 |
| 39 | 9.6 |
| 42 | 8.1 |
| 43 | 9.5 |
| 44 | 7.8 |
| 46 | 9.3 |
| 49 | 11.9 |
| 50 | 11.6 |
| 56 | 7.1 |
| 57 | 7.8 |
| 58 | 9.6 |
| 59 | 9.1 |
| 63 | 5.4 |
| 64 | 9.8 |
| 65 | 8.0 |
| 66 | 8.0 |
| 70 | 9.2 |
| 72 | 10.2 |
| 73 | 9.8 |
| 74 | 9.2 |
| 78 | 9.6 |
| 80 | 9.2 |
| 81 | 4.9 |
| 84 | 4.7 |
| 87 | 4.9 |
| 89 | 5.7 |
| 94 | 5.9 |
| 99 | 5.7 |
| 102 | 5.2 |

What is claimed is:

1. A process for forming, in situ, a gel in a porous structure comprising:
   (a) introducing an effective amount of a gel-forming composition into pores of a porous structure; and
   (b) allowing said gel-forming composition to form a gel in said pores, said thusly formed gel being capable of being formed by reacting
   i. an aqueous solution comprising a first substance selected from the group consisting of polyvinyl alcohols, polyvinyl alcohol copolymers, and mixtures thereof, and
   ii. a second substance comprising aldehyde operable for effecting a crosslinking reaction with said first substance, wherein the total amount of aldehyde is from about 0.005 to about 2.5% of the weight of the gel.

2. A process for forming, in situ, a gel in a porous structure comprising:
   (a) introducing an effective amount of a gel-forming composition into pores of a porous structure; and
   (b) allowing said gel-forming composition to form a gel in said pores, said thusly formed gel being formed by reacting
   i. an aqueous solution comprising a first substance selected from the group consisting of polyvinyl alcohols, polyvinyl alcohol copolymers, and mixtures thereof, and
   ii. a second substance comprising aldehyde operable for effecting a crosslinking reaction with said first substance, wherein the total amount of aldehyde is from about 0.005 to about 2.5% of the weight of the gel-forming composition.

3. A process for forming, in situ, a gel in a porous structure comprising;
   (a) introducing an effective amount of a gel-forming composition into pores of a porous structure; and
   (b) allowing said gel-forming composition to form a gel in said pores, said thusly formed gel being formed by reacting
   i. an aqueous solution comprising a first substance selected from the group consisting of polyvinyl alcohols polyvinyl alcohol copolymers, and mixtures thereof, and
   ii. a second substance comprising aldehyde or aldehyde derivative operable for effecting a crosslinking reaction with said first substance, wherein the total amount of aldehyde is from about 0.005 to about 2.5% of the weight of the gel-forming composition.

4. The process of claim 3, wherein said crosslinking reaction forms acetal crosslinkages.

5. A process for forming, in situ, a gel in a subterranean formation comprising:
   (a) introducing an aqueous solution which comprises a first substance selected from the group consisting of polyvinyl alcohols, polyvinyl alcohol copolymers, and mixtures thereof, into the voids of a subterranean formation;
   (b) introducing into said voids a second substance comprising aldehyde or aldehyde derivative operable for effecting a crosslinking reaction with said first substance; and
   (c) forming a gel in said voids by the reaction of said aqueous solution with said second substance, wherein the total amount of aldehyde is from about 0.005 to about 2.5% of the weight of the gel.

6. The process of claim 5, wherein said gel is formed in the presence of an acidic catalyst.

7. The process of claim 6, wherein said acidic catalyst is a Bronsted acid.

8. The process of claim 6, wherein said acidic catalyst is a Lewis acid.

9. The process of claim 6, wherein said acidic catalyst is selected from the group consisting of acetin, diacetin, and mixtures thereof.

10. The process of claim 5, wherein said aqueous solution comprises a brine.

11. The process of claim 5, wherein said aqueous solution has a pH between about 2 and about 5.

12. The process of claim 5, wherein said subterranean formation has a temperature of at least about 125° C.

13. The process of claim 5, wherein said first substance is polyvinyl alcohol, wherein said aldehyde is dialdehyde.

14. The process of claim 13, wherein said polyvinyl alcohol has an average molecular weight of at least about 100,000; wherein said dialdehyde is selected from the group consisting of glyoxal, malonaldehyde, succinaldehyde, glutaraldehyde, adipaldehyde, and mixtures thereof; and wherein said polyvinyl alcohol is about 0.5 to about 5% of the weight of said thusly formed gel, and wherein said dialdehyde is about 0.005 to about 2.5% of the weight of said thusly formed gel.

15. The process of claim 14, wherein said dialdehyde is glyoxal.

16. The process of claim 14, wherein said dialdehyde is glutaraldehyde.

17. A process for forming, in situ, a gel in a subterranean formation comprising:
  (a) introducing an aqueous solution which comprises a first substance selected from the group consisting of polyvinyl alcohols, polyvinyl alcohol copolymers, and mixtures thereof, into voids of a subterranean formation;
  (b) introducing into said voids a second substance comprising aldehyde or aldehyde derivative operable for effecting a crosslinking reaction with said first substance;
  (c) introducing a third substance comprising an acidic catalyst into said voids; and
  (d) forming a gel in said voids by the reaction of said aqueous solution with said second substance in the presence of said third substance, wherein the total amount of aldehyde is from about 0.005 to about 2.5% of the weight of the gel.

18. The process of claim 17, wherein said acidic catalyst is a Bronsted acid.

19. The process of claim 17, wherein said acidic catalyst is a Lewis acid.

20. The process of claim 17, wherein said acidic catalyst is a delayed action catalyst.

21. The process of claim 17, wherein said acidic catalyst is selected from the group consisting of acetin, diacetin, and mixtures thereof.

22. The process of claim 17, wherein said aqueous solution comprises a brine.

23. The process of claim 17, wherein said aqueous solution and said second substance are introduced into said voids in one time period, and said third substance is introduced into said voids in another time period which is different from said first mentioned time period.

24. The process of claim 17, wherein said aqueous solution is introduced into said voids in one time period, and said second substance and said third substance are introduced into said voids in another time period which is different from said first mentioned time period.

25. The process of claim 17, further comprising mixing said aqueous solution, said second substance, and said third substance together before introducing them into said voids.

26. The process of claim 25, wherein said acidic catalyst is a delayed action catalyst.

27. The process of claim 17, wherein said first substance is polyvinyl alcohol, and wherein said aldehyde is dialdehyde.

28. The process of claim 27, wherein said polyvinyl alcohol has an average molecular weight of at least about 100,000, wherein said dialdehyde is selected from the group consisting of glyoxal malonaldehyde, succinaldehyde, glutaraldehyde, adipaldehyde, and mixtures thereof, wherein said polyvinyl alcohol is about 0.5 to about 5% of the weight of said thusly formed gel, and wherein said dialdehyde is about 0.005 to about 2.5% of the weight of said thusly formed gel.

29. The process of claim 27, wherein said dialdehyde is glyoxal.

30. The process of claim 27, wherein said dialdehyde is glutaraldehye.

31. A process for retarding the flow of water in a subterranean formation comprising introducing an effective amount of a gel-forming composition into a subterranean formation, said gel-forming composition being operable when gelled in said formation for retarding the flow of water therein by the formation of a gel therein, said thusly formed gel being capable of being formed by reacting
  i. an aqueous solution comprising a first substance selected from the group consisting of polyvinyl alcohols, polyvinyl alcohol copolymers, and mixtures thereof, wherein said first substance is from about 0.5 to about 5% of the weight of said gel-forming composition, and
  ii. a second substance comprising aldehyde or aldehyde derivative operable for effecting a crosslinking reaction with said first substance, wherein said second substance is from about 0.005 to about 2.5% of the weight of said gel-forming composition and wherein water provides at least about 95% of the weight of said gel-forming composition.

32. The process of claim 31, wherein said gel-forming composition is formed by reacting said aqueous solution and said second substance.

33. The process of claim 32, wherein said aldehyde is glyoxal.

34. The process of claim 32, wherein said aldehyde is glutaraldehyde.

35. The process of claim 31, wherein said crosslinking reaction forms acetal crosslinkages.

36. The process of claim 31, wherein said subterranean formation has a temperature of at least about 80° C.

37. The process of claim 31, wherein said subterranean formation has a temperature of at least about 125° C.

38. The process of claim 31, wherein said aqueous solution is formed from water having a hardness of at least about 6000 ppm.

39. The process of claim 31, wherein said aqueous solution is formed from water having a total dissolved solids content of at least about 80,000 ppm.

40. The process of claim 31, wherein said first substance is polyvinyl alcohol, and said aldehyde is dialdehyde.

41. The process of claim 40, wherein said polyvinyl alcohol has an average molecular weight of at least 100,000, and wherein said dialdehyde is selected from the group consisting of glyoxal, malonaldehyde, succinaldehyde, glutaraldehyde, adipaldehyde, and mixtures thereof.

42. A process for retarding the flow of water in a subterranean formation comprising:
  (a) introducing an effective amount of a gel-forming composition into a subterranean formation, said gel-forming composition being operable when gelled in said formation for retarding the flow of water therein by the formation of a gel therein, said thusly formed gel being capable of being formed by reacting
  i. an aqueous solution comprising a first substance selected from the group consisting of polyvinyl alcohols, polyvinyl alcohol copolymers, and mixtures thereof, wherein said first substance is from about 0.5 to about 5% of the weight of said gel-forming composition, and
  ii. a second substance comprising an aldehyde or aldehyde derivative operable for effecting a crosslinking reaction with said first substance, wherein said second substance is from about 0.005 to about 2.5% of the weight of said gel-forming composition, and wherein water provides at least about 95% of the weight of said gel-forming composition; and (b) allowing said gel-forming composition to react in said formation and to form a gel therein which is effective for retarding the flow of water in said formation.

43. A process for retarding the flow of water and producing hydrocarbons from a subterranean hydrocarbon-producing formation comprising:
    (a) introducing an effective amount of a gel-forming composition into a subterranean water-conveying formation, which is in water communication with a subterranean hydrocarbon-producing formation, said gel-forming composition being operable when gelled in said subterranean water-conveying formation for retarding the flow of water therein by the formation of a gel therein, said thusly formed gel being capable of being formed from
    i. an aqueous solution comprising a first substance selected from the group consisting of polyvinyl alcohols, polyvinyl alcohol copolymers, and mixtures thereof, wherein said first substance is from about 0.5 to about 5% of the weight of said gel-forming composition, and
    ii. a second substance comprising an aldehyde or aldehyde derivative operable for effecting a crosslinking reaction with said first substance, wherein said second substance is from about 0.005 to about 2.5% of the weight of said gel-forming composition, and wherein water provides at least about 95% of the weight said gel-forming composition;
    (b) allowing said gel-forming composition to react in said subterranean water-conveying formation to form a gel therein which is operable for retarding the flow of water therein and also operable for retarding the production of water when producing hydrocarbons from said hydrocarbon-producing formation; and
    (c) producing hydrocarbons and retarding the production of water from said subterranean hydrocarbon-producing formation.

44. The process of claim 43, wherein said subterranean water-conveying formation is under said subterranean hydrocarbon-producing formation.

45. The process of claim 43, wherein said subterranean water-conveying formation surrounds said subterranean hydrocarbon-producing formation.

46. The process of claim 43, wherein at least a part of said subterranean water-conveying formation coincides with at least a part of said subterranean hydrocarbon-producing formation.

47. The process of claim 3, wherein said second substance comprises an aldehyde derivative which is selected from the group consisting of compounds which generate aldehydes in water.

48. The process of claim 5, wherein said second substance comprises an aldehyde derivative which is selected from the group consisting of compounds which generate aldehydes in water.

49. The process of claim 17, wherein said second substance comprises an aldehyde derivative which is selected from the group consisting of compounds which generate aldehydes in water.

50. The process of claim 3, wherein said gel-forming composition is about 0.5 to about 5% by weight said first substance, and about 0.005 to about 2.5% by weight said aldehyde or aldehyde derivative.

51. The process of claim 5, wherein said gel composition is about 0.5 to about 5% by weight said first substance, and about 0.005 to about 2.5% by weight said aldehyde or aldehyde derivative.

52. The process of claim 17, wherein said gel composition is about 0.5 to about 5% by weight said first substance, and about 0.005 to about 2.5% by weight said aldehyde or aldehyde derivative.

53. The process of claim 47, wherein said gel-forming composition is about 0.5 to about 5% by weight said first substance, and about 0.005 to about 2.5% by weight said aldehyde derivative.

54. The process of claim 48, wherein said gel composition is about 0.5 to about 5% by weight said first substance, and about 0.005 to about 2.5% by weight said aldehyde derivative.

55. The process of claim 49, wherein said gel composition is about 0.5 to about 5% by weight said first substance, and about 0.005 to about 2.5% by weight said aldehyde derivative.

56. A process for forming, in situ, a gel in a porous structure comprising:
    (a) introducing an effective amount of a gel-forming composition into pores of a porous structure; and
    (b) allowing said gel-forming composition to form a gel in said pores, said thusly formed gel being capable of being formed by reacting
    i. an aqueous solution comprising a first substance selected from the group consisting of polyvinyl alcohols, polyvinyl alcohol copolymers, and mixtures thereof, and
    ii. a second substance comprising aldehyde operable for effecting a crosslinking reaction with said first substance, wherein the total amount of aldehyde is from about 0.005 to about 2.5% of the weight of the gel-forming composition wherein the amount of said first substance is from about 0.5 to about 5% of the weight of the gel-forming composition, and wherein water provdes at least about 95% of the weight of the gel-forming composition.

57. The process of claim 56, wherein water provides at least about 97% of the weight of the gel-forming composition.

58. The process of claim 56, wherein said gel-forming composition also comprises an acetate salt.

59. The process of claim 56, wherein said gel-forming composition also comprises sodium acetate and acetic acid.

60. The process of claim 59, wherein said sodium acetate is from about 0.10 to about 2% of the weight of said gel-forming composition.

61. A process for forming, in situ, a gel in a porous structure comprising:
    (a) introducing an effective amount of gel-forming composition into pores of a porous structure; and
    (b) allowing said gel-forming composition to form a gel in said pores, said thusly formed gel being formed by reacting
    i. an aqueous solution comprising a first substance selected from the group consisting of polyvinyl alcohols, polyvinyl alcohol copolymers, and mixtures thereof, and
    ii. a second substance comprising aldehyde operable for effecting a crosslinking reaction with said first substance, wherein the total amount of aldehyde is from about 0.005 to about 2.5% of the weight of the gel-forming composition, wherein the amount of said first substance is from about 0.5 to about 5% of the weight of the gel-forming composition, and wherein water provides at least about 95% of the weight of the gel-forming composition.

62. The process of claim 61, wherein water provides at least about 97% of the weight of the gel-forming composition.

63. The process of claim 61, wherein said gel-forming composition also comprises an acetate salt.

64. The process of claim 61, wherein said gel-forming composition also comprises sodium acetate and acetic acid.

65. The process of claim 64, wherein said sodium acetate is from about 0.10 to about 2% of the weight of said gel-forming composition.

66. A process for forming, in situ, a gel in a porous structure comprising:
(a) introducing an effective amunt of a gel-forming composition into pores of a porous structure; and
(b) allowing said gel-forming composition to form a gel in said pores, said thusly formed gel being formed by reacting
 i. an aqueous solution comprising a first substance selected from the group consisting of polyvinyl alcohols, polyvinyl alcohol copolymers, and mixtures thereof, and
 ii. a second substance comprising aldehyde or aldehyde derivative operable for effecting a crosslinking reaction with said first substance, wherein the total amount of aldehyde is from about 0.005 to about 2.5% of the weight of the gel-forming composition, wherein the amount of said first substance is from about 0.5 to about 5% of the weight of the gel-forming composition, and wherein water provides at least about 95% of the weight of the gel-forming composition.

67. The process of claim 66, wherein water provides at least about 97% of the weight of the gel-forming composition.

68. A process forming, in situ, a gel in a subterranean formation comprising:
(a) introducing an aqueous solution which comprises a first substance selected from the group consisting of polyvinyl alcohols, polyvinyl alcohol copolymers, and mixtures thereof, into a subterranean formation;
(b) introducing into said formation a second substance comprising aldehyde or aldehyde derivative operable for effecting a crosslinking reaction with said first substance; and
(c) forming a gel in said formation by the reaction of said aqueous solution with said second substance, wherein the total amount of aldehyde is from about 0.005 to about 2.5% of the weight of the gel, wherein the amount of said first substance is from about 0.5 to about 5% of the weight of the gel, and wherein water provides at least about 95% of the weight of the gel.

69. The process of claim 68, wherein water provides at least about 97% of the weight of the gel.

70. The process of claim 68, further comprising introducing an acetate salt into said subterranean formation and wherein said gel also comprises said acetate salt.

71. The process of claim 68, further comprising introducing acidic acid and an acetate into said subterranean formation, and wherein said gel also comprises sodium acetate and acetic acid.

72. The process of claim 71, wherein said sodium acetate is from about 0.10 to about 2% of the weight of said gel.

73. A process for forming, in situ, a gel in a subterranean formation comprising:
(a) introducing aqueous solution which comprises a first substance selected from the group consisting of polyvinyl alcohols, polyvinyl alcohol copolymers, and mixtures thereof, into a subterranean formation;
(b) introducing into said formation a second substance comprising aldehyde or aldehyde derivative operable for effecting a crosslinking reaction with said first substance;
(c) introducing a third substance comprising an acidic catalyst into said formation; and
(d) forming a gel in said formation by the reaction of said aqueous solution with said second substance in the presence of said third substance, wherein the total amount of aldehyde is from about 0.005 to about 2.5% of the weight of the gel, wherein the amount of said first substance is from about 0.5 to about 5% of the weight of the gel, and wherein water provides at least about 95% of the weight of the gel.

74. The process of claim 73, wherein water provides at least about 97% of the weight of the gel.

75. The process of claim 1, wherein said gel-forming composition also comprises an acetate salt.

76. The process of claim 2, wherein said gel-forming composition also comprises an acetate salt.

77. The process of claim 3, wherein said gel-forming composition also comprises an acetate salt.

78. The process of claim 5, further comprising introducing an acetate salt into said subterranean formation and wherein said gel also comprises said acetate salt.

79. The process of claim 17, further comprising introducing an acetate salt into said subterranean formation and wherein said gel also comprises said acetate salt.

80. The process of claim 31, wherein said gel-forming composition also comprises an acetate salt.

81. The process of claim 42, wherein said gel-forming composition also comprises an acetate salt.

82. The process of claim 43, wherein said gel-forming composition also comprises an acetate salt.

83. A process for forming, in situ, a gel in a porous structure comprising:
(a) introducing an effective amount of a gel-forming composition into pores of a porous structure; and
(b) allowing said gel-forming composition to form a gel in said pores, said thusly formed gel being formed by reacting
 i. an aqueous solution comprising a first substance selected from the group consisting of polyvinyl alcohols, polyvinyl alcohol copolymers, and mixtures thereof,
 ii. a second substance comprising aldehyde or aldehyde derivative operable for effecting a crosslinking reaction with said first substance, wherein the total amount of aldehyde is from about 0.005 to about 2.5% of the weight of the gel-forming composition, wherein the amount of said first substance is from about 0.5 to about 5% of the weight of the gel-forming composition, and wherein water provides at least abut 95% of the weight of the gel-forming composition, and
 iii. an acetate salt.

84. A process for forming, in situ, a gel in a porous structure comprising:
(a) introducing an effective amount of a gel-forming composition into pores of a porous structure; and
(b) allowing said gel-forming composition to form a gel in said pores, said thusly formed gel being formed by reacting
i. an aqueus solution comprising a first substance selected from the group consisting of polyvinyl alcohols, polyvinyl alcohol copolymers, and mixtures thereof,
ii. a second substance comprising aldehyde or aldehyde derivative operable for effecting a crosslinking reaction with said first substance, wherein the total amount of aldehyde is from about 0.005 to about 2.5% of the weight of the gel-forming composition, wherein the amount of said first substance is from about 0.5 to about 5% of the weight of the gel-forming composition, and wherein water provides at least about 95% of the weight of the gel-forming composition, and
iii. sodium acetate.

85. The process of claim 84, wherein said gel-forming composition also comprises acetic acid.

86. The process of claim 84, wherein said sodium acetate is from about 0.10 to about 2% of the weight of said gel-forming composition.

87. A process for forming, in situ, a gel in a subterranean formation comprising:
(a) introducing an aqueous solution which comprises a first substance selected from the group consisting of polyvinyl alcohols, polyvinyl alcohol copolymers, and mixtures thereof, into a subterranean formation;
(b) introducing into said formation a second substance comprising aldehyde or aldehyde derivative operable for effecting a crosslinking reaction with said first substance;
(c) introducing an acidic catalyst into said formation;
(d) introducing an acetate salt into said formation; and
(e) forming a gel in said formation by the reaction of said aqueous solution with said second substance in the presence of said acidic catalyst and said acetate salt, wherein the total amount of aldehyde is from about 0.005 to about 2.5% of the weight of the gel, wherein the amount of said first substance is from about 0.5 to about 5% of the weight of the gel, and wherein water provides at least about 95% of the weight of the gel.

88. A process for forming, in situ, a gel in a subterranean formation comprising:
(a) introducing an aqueous solution which comprises a first substance selected from the group consisting of polyvinyl alcohols, polyvinyl alcohol copolymers, and mixtures thereof, into a subterranean formation;
(b) introducing into said formation a second substance comprising aldehyde or aldehyde derivative operable for affecting a crosslinking reaction with said first substance;
(c) introducing an acidic catalyst into said formation;
(d) introducing sodium acetate into said formation; and forming a gel in said formation by the reaction of said aqueous solution with said second substance in the presence of said acidic catalyst and said sodium actate, wherein the total amount of aldehyde is from about 0.005 to about 2.5% of the weight of the gel, wherein the amount of said first substance is from about 0.5 to about 5% of the weight of the gel, and wherein water provides at least about 95% of the weight of the gel.

89. The process of claim 88, further comprising introducing acidic acid into said subterranean formation.

90. The process of claim 88, wherein said sodium acetate is from about 0.10 to about 2% of the weight of said gel.

* * * * *